United States Patent [19]

Inoue

[11] Patent Number: 4,586,576
[45] Date of Patent: May 6, 1986

[54] MEASURING SYSTEM

[75] Inventor: Kiyoshi Inoue, Tokyo, Japan

[73] Assignee: Inoue-Japax Research Incorporated, Yokohama, Japan

[21] Appl. No.: 536,891

[22] Filed: Sep. 28, 1983

[30] Foreign Application Priority Data

Sep. 28, 1982 [JP] Japan .................... 57-167695
Sep. 28, 1982 [JP] Japan .................... 57-167696

[51] Int. Cl.$^4$ ................ G01G 3/14; G01L 1/12; G01B 7/14
[52] U.S. Cl. ................ 177/210 R; 177/DIG. 5; 73/779; 324/208; 33/DIG. 1
[58] Field of Search .............. 177/210 R, DIG. 5; 33/DIG. 1, DIG. 13; 73/779; 324/208; 336/110

[56] References Cited

U.S. PATENT DOCUMENTS

| | | | |
|---|---|---|---|
| 1,635,090 | 7/1927 | Linwood | 177/DIG. 5 |
| 2,914,756 | 11/1959 | Heidenhain et al. | 324/208 |
| 3,535,920 | 10/1970 | Bernaix | 73/779 |
| 3,948,088 | 4/1976 | Shapherd | 73/779 X |
| 4,471,304 | 9/1984 | Wolf | 324/208 |

FOREIGN PATENT DOCUMENTS

| | | |
|---|---|---|
| 1648682 | 7/1973 | Fed. Rep. of Germany . |
| 2403854 | 9/1979 | Fed. Rep. of Germany . |
| 156517 | 9/1982 | Japan .................... 33/DIG. 1 |

Primary Examiner—George H. Miller, Jr.
Attorney, Agent, or Firm—Karl F. Ross; Erbert Dubno

[57] ABSTRACT

A measuring system using the magnetic scale and a sensing head measures a deformation of a deformable member and/or one or more physical quantities, e.g. a strain and internal stress of, or an external force to, the member, which are functions of the deformation. The magnetic scale comprises a succession of discrete, uniformly spaced scaling units each of which individually consists of a pair of magnetic poles (N, S). The magnetic scale is arranged to be displaceable relative to the magnetic sensing head in response to a deformation of the deformable member so that the magnetic pickup head successively senses the passage of the magnetic scaling units. An output circuit unit is connected to the magnetic head for counting the number of magnetic scaling units sensed corresponding to the deformation and produces an electrical output signal representative thereof, and/or one or more of the above physical quantities.

15 Claims, 16 Drawing Figures

MEASURING SYSTEM

FIELD OF THE INVENTION

The present invention relates generally to deformation sensing and, more particularly, to a system for measuring a deformation of a deformable object and, inter alia, of an object which is elastically or reversibly deformable and a physical quantity which is a function of the deformation, such as strain, elongation and internal stress in the object as well as an external force, pressure or a change in temperature causing the deformation.

BACKGROUND OF THE INVENTION

While various sensing and measuring systems of the class described have been proposed heretofore, these conventional systems have left much to be desired. For example, a strain gauge which has been utilized uses the change of electrical resistance of a wire under strain to measure pressure. This system requires a complicated bridge circuit and must base the measurement upon a small change in the resistance so that these is a severe limitation to the degree to which the S/N (signal to noise) ratio which can be reduced. Among others, this disadvantage is applicable to practically all of these systems as proposed in the prior art.

OJBECT OF THE INVENTION

Accordingly, the present invention seeks to provide a new, improved deformation measuring system which is relatively simple in structure, reliable in reading and accurate in measurement.

SUMMARY OF THE INVENTION

According to the present invention, there is provided a measuring system which comprises: a magnetic pickup means; a magnetic scale having a succession of discrete, uniformly spaced scaling units each of which individually consists of a pair of magnetic poles (N, S), the magnetic scale being arranged to be displaced relative to the magnetic pickup means in response to a deformation of a deformable solid object whereby the magnetic pickup means successively senses the magnetic scaling units; and circuit means connected to the magnetic pickup means for counting a number of the sensed magnetic scaling units corresponding to the said deformation and producing an electrical output signal representing the said deformation or a physical quantity which is a function thereof.

BRIEF DESCRIPTION OF THE DRAWING

These and other features of the present invention as well as advantages thereof will become apparent from a reading of the following description when taken with reference to the accompanying drawing in which.

SPECIFIC DESCRIPTION

Figure 1:
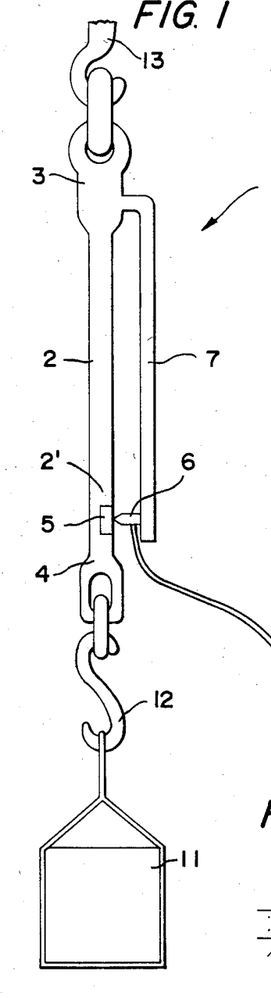
FIG. 1 is a schematic view diagrammatically illustrating the principles of the present invention applied to one embodiment.
Figure 2:
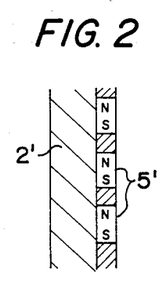
FIGS. 2-5 are longitudinal views in section diagrammatically illustrating different forms of an elongate element or carrier body having a magnetic scale formed thereon.
Figure 3:
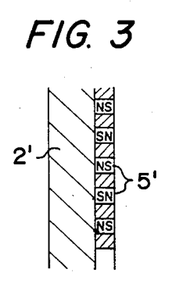
Figure 4:
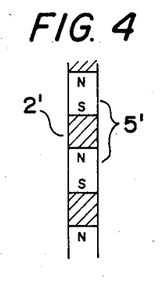
Figure 5:
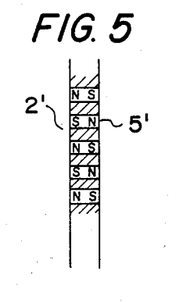

In FIG. 1 the measuring system 1 shown comprises an elongate, elastically deformable element 2 in the form of a wire, string or band of a known Young's modulus which is uniform in cross section in the direction of a length thereof. The deformable element 2 has a pair of enlarged, rigid ends 3 and 4 which may be attached thereto or integrally formed therewith. A magnetic scale 5, having a surface magnetic flux density preferably in excess of 50 Gauss, is shown as carried on a region 2' of the element 2 near one of these ends, 4, and comprises a succession of discrete scaling units which are uniformly spaced with a pitch p (e.g. between 50 and 100 $\mu$m and arranged successively longitudinally of an axis of the deformable element 2 and each of which individually consists of a pair of magnetic poles (N, S). To this end, a thin film, having a thickness, say of 1 mm, of the magnetic scale 5 may be attached on the region as shown in FIGS. 2 and 3 and may be composed of an iron-chromium or a platinum-cobalt based magnetic alloy. Alternatively, the element 2 may itself be composed of such a magnetic alloy and processed (i.e. magnetized) to form a region 2' of the magnetic scale as shown in FIGS. 4 and 5. Each of the magnetic scaling units 5' may be aligned longitudinally of the axis of the element 2 as shown in FIGS. 2 and 4 but, to increase the scaling density and resolution, it is desirable that the unit 5' be aligned perpendicular to the longitudinal axis. In the latter case, the successive units 5' are arranged so as to alter their magnetic polarities in the direction of that axis of the element 2.

Figure 6:
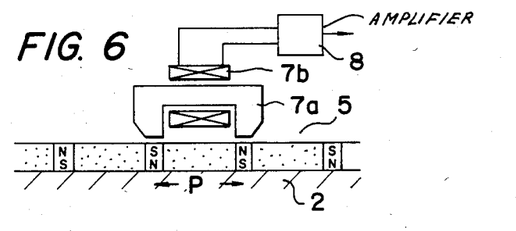
FIG. 6 is a sectional view diagrammatically illustrating a magnetic pickup head and a magnetic scale being sensed thereby.

Positioned in magnetic sensing relationship with the magnetic scale 5 is a magnetic pickup head 6 which is carried at one end of a rigid arm or member 7, which extends parallel to the elongate element 2 and is secured to the other end 3 thereof. When this latter end 3 is rigidly fixed and a load, e.g. an axially pulling load, is applied to the element 2 from the end 4, a longitudinal deformation of the element caused under this load results in a relative displacement of the magnetic scale 5 and to the pickup head 6. The latter is then enabled to successively sense magnetic scaling units 5' in the scale 5. The pickup head 6 may be of a conventional design, having a U-shaped yoke 7a and a sensing coil 7b wound thereon which is connected to an amplifier stage 8 (FIG. 6). Each time the yoke 7a traverses one pitch p of the magnetic scaling units, the coil 7b provides an impulse which is amplified by the amplifier stage 8 to provide a digital pulse. Thus, the amplifier stage or sensing circuit 8 provides a succession of digital pulses corresponding in number to pitch units of the scaling units 5' traversed by the pickup head 6. The sensing circuit 8 is connected to a counter processing stage 9 which counts these pulses and produces an electrical output signal representing the extent of deformation or elongation of the element or a physical quantity which is a function of the deformation, e.g. a force applied by the load. The output signal is displayed by a numerical display unit 10.

The load is shown by a weight 11 which is suspended from the deformable element 2 by means of a hook 12 connecting the weight 11 to the lower end 4. The element 2 is shown as being suspended by means of a hook 13 engaging the upper end 3. A weighing instrument is thus provided.

Figure 7:
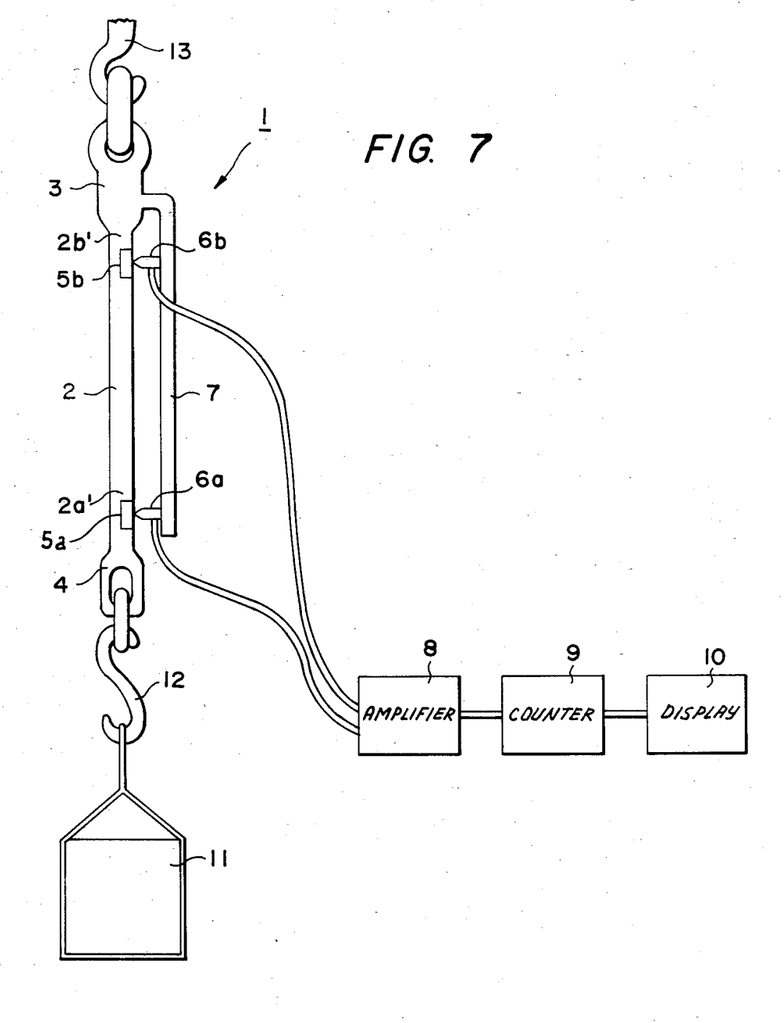
FIGS. 7-9 are schematic views diagrammatically illustrating modifications of the embodiment of the invention shown in FIG. 1.

In the modification shown in FIG. 7, the magnetic scale 5 is provided both in a region 2a' near the lower end 4 and in a region 2b' near the upper end 4 of the deformable element 2. These two magnetic scales designated at 5a and 5b are arranged to be sensed by pickup heads 6a and 6b, respectively. In this arrangement, since the displacement sensed is the difference between the displacements of the position 2a' and 2b', any deformation measured is limited to the length of the element 2 between 2a' and 2b', thus advantageously compensating for the deformation near the end portions.

Figure 8:
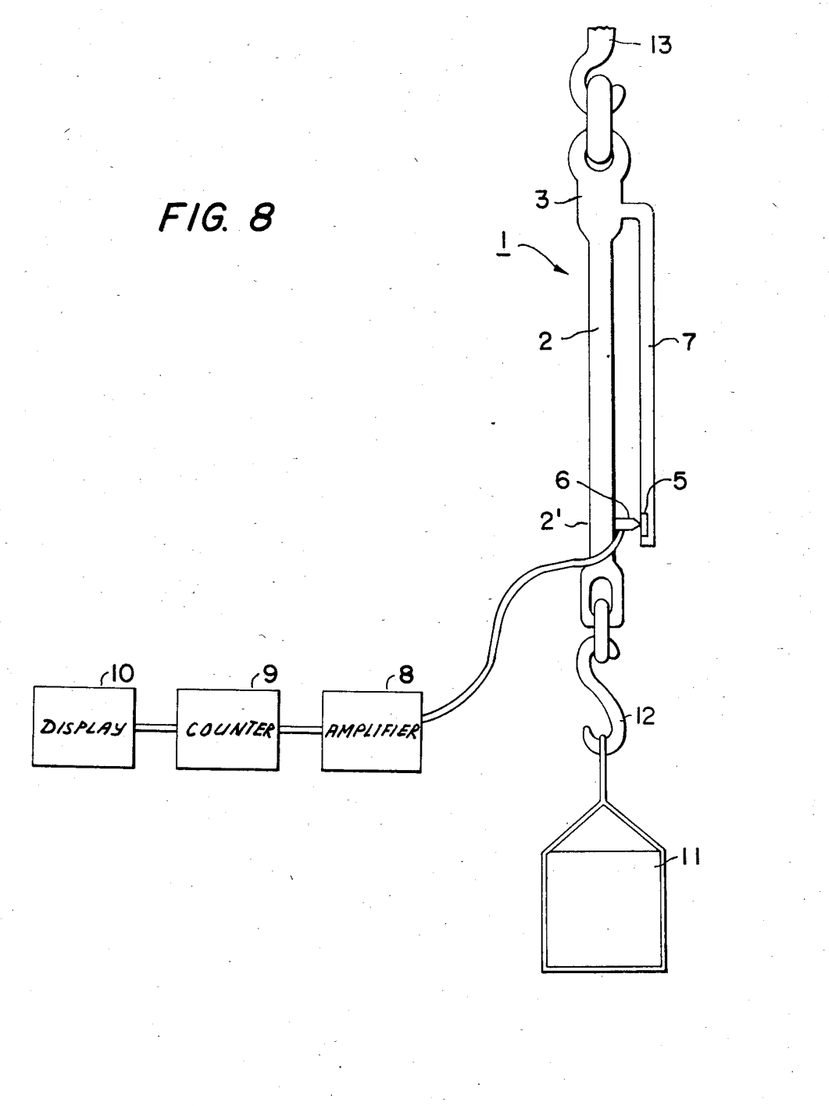

In the modification shown in FIG. 8, the magnetic scale 7 is provided on the holder 5 and the pickup head 6 is mounted on the region 2' to face the scale 5.

Figure 9:
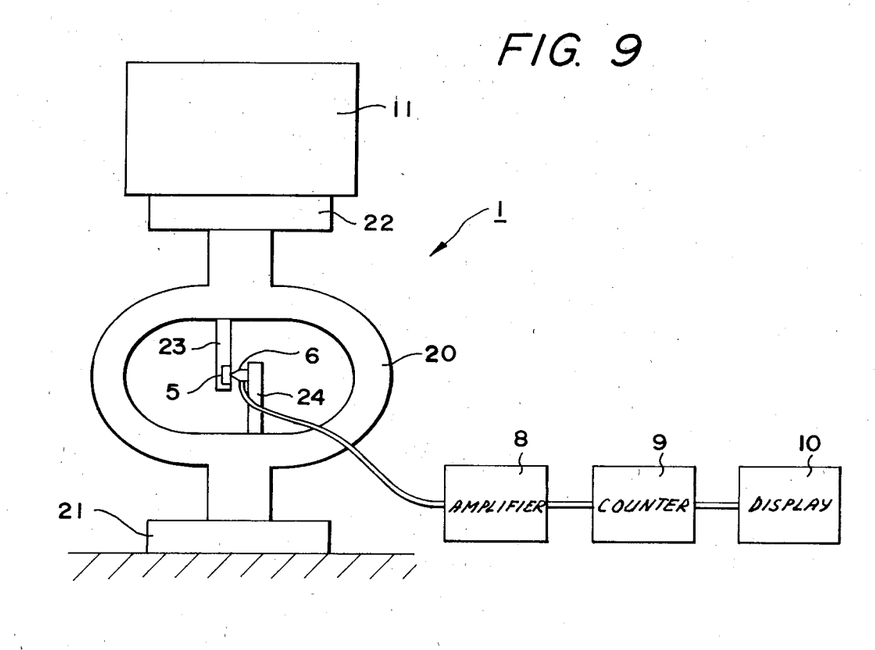

In the modification shown in FIG. 9, the deformable element 20 is in the form of a loop and mounted on a base 21. The element 20 carries a table 22 on which a weight 11 is placed. A scale holder 23 depends vertically from the element 20 inside the loop and carries at a lower end portion thereof a magnetic scale 5. The pickup head 6 facing the magnetic scale 5 is carried on an upper end portion of a head holder 24 which is again vertical and parallel to the scale holder 23.

Figure 10:
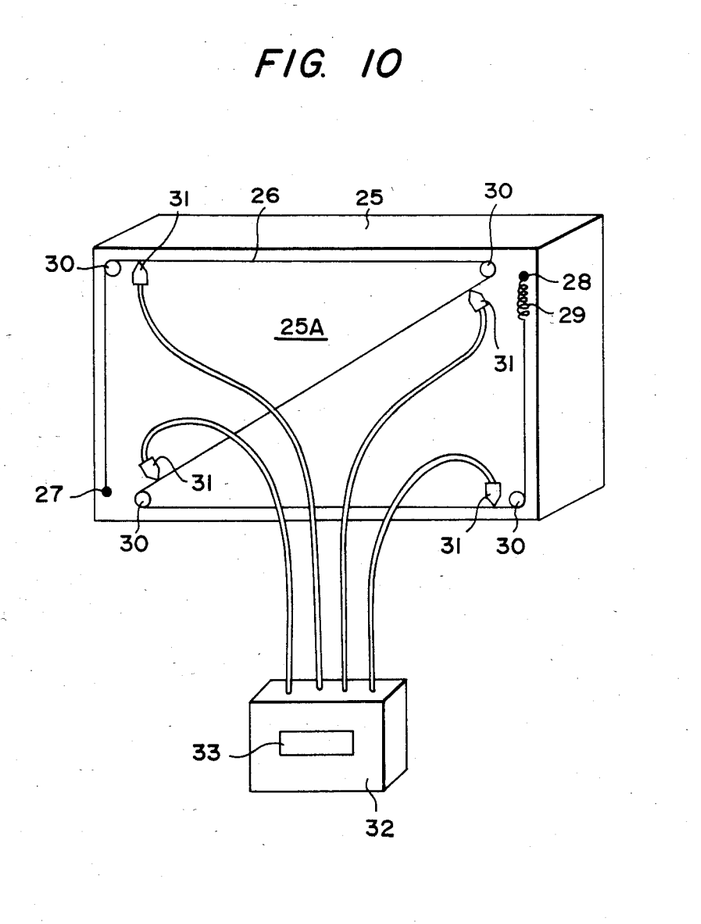
FIG. 10 is a schematic, perspective view diagrammatically illustrating the principles of the present invention which are embodied in another form.

FIG. 10 shows another embodiment of the invention in which a deformation of a deformable object 25, shown in the form of a rectangular body, is measured using an elongate element 26 in the form of a string, wire or band of a known Young's modulus and a known thermal expansion coefficient, which carries thereon a magnetic scale as previously described throughout substantially an entire length or at each of selected longitudinal regions thereof. The element 26 has its ends connected to the deformable object 25 with one end 27 directly thereto and the other end via a spring 29 at its mounting position 28 and is thereby resiliently stretched under a given tension between these mounting positions over a plurality of guide pins 30 which are individually secured to the deformable object 25. In the embodiment shown, all of the mounting positions 27, 28 and the guide pins 30 are located on one rectangular side surface 25A of the deformable object 25 so that the element 26 passes from a region of one corner to a region of the diagonally opposite corner of the rectangle over four sides and one diagonal line in which selected surface areas of interest may be located. Disposed in these surface areas facing the element 25 and the magnetic scales thereon are magnetic pickup heads 31 which are connected to a sensing/computing unit 32 which may have a display 33. The pickup heads 31 are secured to the deformable object 25 respectively in these areas so that when there occurs a deformation of the object 25 due to an external force or thermal stress, the heads 31 will move relative to the element 26 along the magnetic scales thereon. The local deformations in these areas of the object 25 give rise to the corresponding relative displacements between the individual heads 31 and the adjacent magnetic scales on the element 26. The unit 32 includes respective sensing/amplifier/counter stages for the magnetic pickup heads 31 and the outputs of these separate stages are processed to compute the deformation of the object and/or one or more of physical quantities which are functions thereof.

Figure 11:
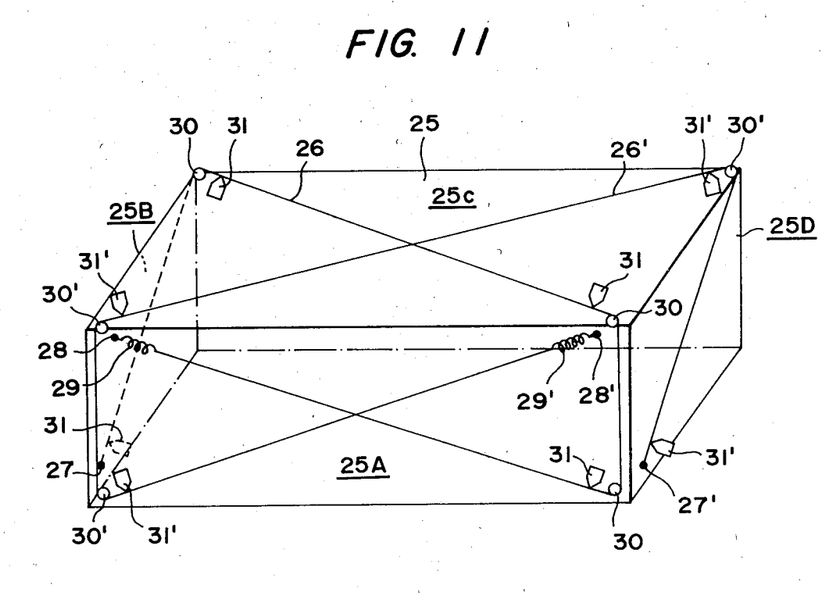
FIGS. 11 and 12 are similar views of modifications of the embodiment of the invention shown in FIG. 10.

In the modification shown in FIG. 11, two elongate elements 26, 26' which individually carry magnetic scales are employed, together with their respectively associated sets of pickup heads 31, 31', to cover four rectangular side surfaces 25A, 25B, 25C and 25D of the deformable object 25. The two elements 26, 26' have their respective two ends both connected to the deformable object 25 with one directly thereto at one corner region 27, 27' of a side plane 25B, 25D and the others respectively via springs 29, 29' at the upper corner regions 28, 28' on a same side surface 25A. The elements 26 and 26' are thereby stretched under a given tension and guided over their respective guide pins 30, 30' to individually pass diagonally over three side surfaces 25B, 25C and 25A, and 25D, 25C and 25A, respectively. In this manner, the area of measurement of local deformations is enlarged with less introduction of any small measurement error.

Figure 12:
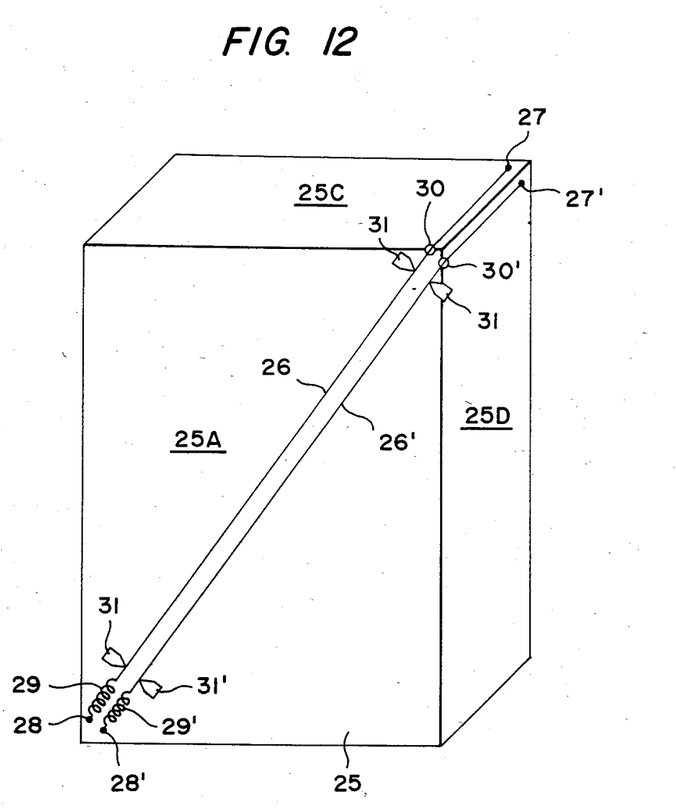

The deformable object 25 may be deformed both under an external force and under a thermal stress or an irregularity in temperature distribution. The embodiment shown in FIG. 12 is designed to separate a given deformation into a component due to an external force and a component due to a thermal stress, and employs a first element 26 having the same thermal expansion coefficient as that of the deformable object 25 and a second element 26' having an extremely low thermal expansion coefficient. The second element 26' may thus be composed of, for example, invar. The two elements 26, 26' are arranged to extend in parallel to each other in a given path which is here shown to be along a ridge formed between two side surfaces 25C and 25D and along a diagonal line on a third side surface 25A which is orthogonal thereto. When a deformation is caused in the object 25 under both influences of external force and thermal stress, the displacement signal developed by one given pickup head in the first set 31 represents the deformation component attributable only to the external force. Then, the thermal deformation component can be detected as a difference between displacement signals developed by the corresponding pickup heads in the second and first sets 31' and 31, respectively.

Figure 13:
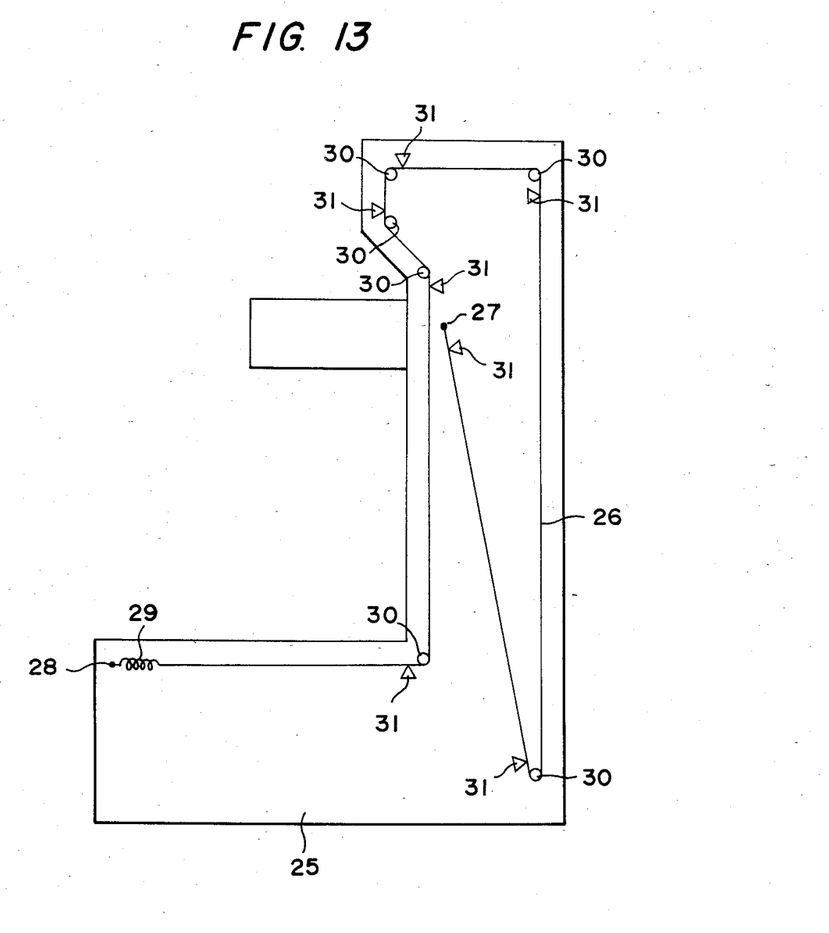
FIG. 13 is a diagrammatic side view of a machine tool incorporating the principles of the invention.

FIG. 13 shows a modification of the embodiment as applied to a machine tool such as an EDM (electrical discharge machining) machine. In the arrangement shown, the element 26 carrying magnetic scales is stretched over one side surface of the machine tool, extending over bed, column and head portions thereof and a plurality of magnetic pickup heads 31 are positioned in magnetic sensing relationship with the magnetic scales on the element 25. Assuming that the machine tool 25 will be deformed only under a thermal stress, it is desirable that the element 26 be composed of a material, such as invar, which suffers practically no thermal deformation. In the absence of no external force applied to the machine tool, a displacement signal developed by one given pickup head 31 represents a local thermal deformation at a site to which the same head is secured. The plurality of signals sensed by these pickup heads 31 may thus be processed in a computer (32, FIG. 10) to compute a dislocation or an error in position of an active element, such as a tool, tool electrode or a supporting element therefor, in the machine tool. In this case, the output of the computer may be connected to a drive unit for such an active element to remove the mispositioning.

Figure 14:
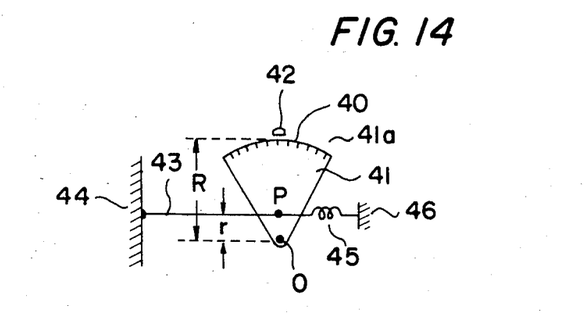
FIGS. 14-16 are schematic plan or side views diagrammatically illustrating the principles of the invention applied to another embodiment.
Figure 15:
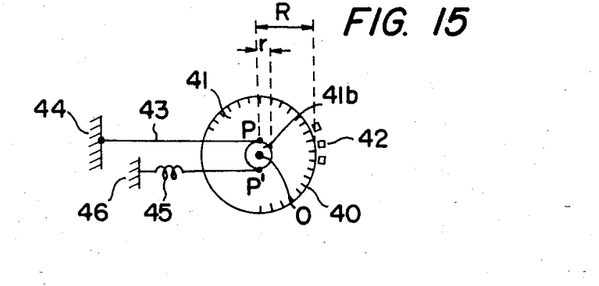
Figure 16:
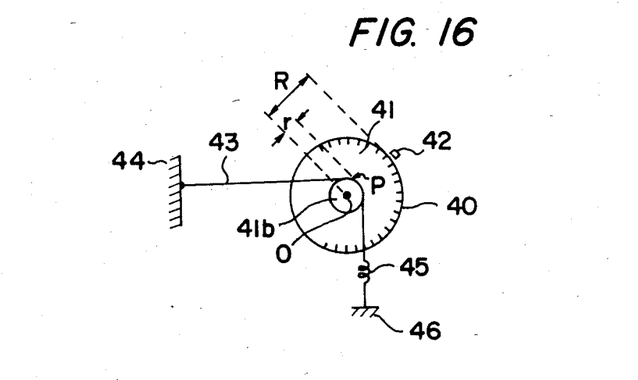

FIGS. 14-16 show further embodiments of the invention using a magnetic scale 40 provided along a peripheral region 41a of a rotary member 51 which will be in the form of a circular disk (FIGS. 15 and 16) or a segment thereof (FIG. 14), having a radius R' and is arranged to be rotated about its center O. A magnetic pickup head 42 is positioned in magnetic sensing relationship with the magnetic scale 40 on the rotary member 41. An elongated element 43, again in the form of a string, wire or band, having an extremely low or a known thermal expansion coefficient (e.g. invar, quartz or glass fiber) and a known Young's modulus, which has one end secured to a load 44 (e.g. a deformable object or an external force) is coupled to the rotary member 41 at a position P thereon which is midway between the center O and the periphery 41a and is spaced by a distance r from the center O. A spring 45 is also provided to connect the rotary member 41 to a fixed surface 46 so as to maintain the member 41 in its neutral position under a given value of the load 44.

In the arrangement of FIG. 14, both the element 43 and the spring 45 are secured at a single point P on the rotary member 41 to hold the rotary member 41 at a point midway between the load 44 and the fixed surface 46. In the arrangement of FIG. 15, the element 43 is secured to the circular (annular) disk member 41 at a point P on an axle or shaft 41b thereof (or securely fitted therein), and the spring 45 secured to the fixed surface 46 and extending parallel to the element 43 is secured to the member 41 at a point P' on the shaft 41b which is diametrically opposite to the point P so that when the load 44 has a given value, the rotary member 41 is located in a neutral position in which the points P, O and P' line on a line perpendicular to the element 43. In the arrangement of FIG. 16, the element 43 is guided over and turned around the shaft 41b by 90° and then connected via the spring 45 to the fixed surface 46.

In each of these arrangements, when the load 44 is varied, the rotary member 41 is rotated clockwise or counter-clockwise depending on whether the load is decreased or increased and by an angular extent dependent on the value of decrease or increase thereof. In this respect it will be seen that the displacement of the element 43 about the point O is advantageously magnified by R/r for the displacement of the magnetic scale 40 sensed by the pickup head 42. By virtue of this magnification, even a small change in the load 44 can be reproduced as a large signal by the pickup head 42 so that a substantially error-free, high-precision measurement of the load 44 is achieved. In a modification of the system, the load 44 may be fixed and a thermal deformation of the elongate element 43 may be measured as an output of the pickup head 42.

What is claimed is:

1. A measuring system comprising:
   a magnetic pickup means for responding to magnetic fields;
   a magnetic scale formed by a succession of discrete, uniformly spaced scaling units each of which individually consists of a pair of opposed magnetic poles (N,S), the successive pairs of opposed magnetic poles alternating in their magnetic polarities in a direction which is the same as or substantially parallel to a direction in which a deformable member is deformed, said magnetic scale being arranged to be displaced relative to the magnetic pickup means by an amount related to a deformation of the deformable member whereby the magnetic pickup means successively senses the passage of the magnetic scaling units; and
   circuit means for counting the number of said magnetic scaling units sensed and producing an electrical output signal representing said deformation, or a physical quantity which is a function thereof.

2. The system defined in claim 1 wherein one of said magnetic pickup means and said magnetic scale is mounted on said deformable member.

3. The system defined in claim 2 wherein said deformable member is an elongate element in the form of a string, wire or band.

4. The system defined in claim 3 wherein said physical quantity is an external force applied longitudinally of said elongate element from one end portion thereof to elongate said element and said succession of the magnetic scaling units are mounted to extend longitudinally of said element.

5. The system defined in claim 4 wherein the other of said magnetic pickup means and said magnetic scale is carried by a holder member extending substantially parallel to, and secured to the other end portion of, said elongate element.

6. The system defined in claim 1, claim 2, claim 3, claim 4 or claim 5 wherein said magnetic scale is composed of a substance selected from the group which consists of iron-chromium alloys and platinum-cobalt alloys.

7. A measuring system, comprising:
   a magnetic pickup means;
   a magnetic scale having a succession of discrete, uniformly spaced scaling units each of which individually consists of a pair of magnetic poles (N, S), said magnetic scale being carried by an elongate element resiliently secured to a deformable member and being arranged to be displaced relative to the magnetic pickup means in response to a deformation of said deformable member whereby the magnetic pickup means successively senses the passage of the magnetic scaling units; and
   circuit means for counting the number of said magnetic scaling units sensed and producing an electrical output signal representing said deformation, or a physical quantity which is a function thereof.

8. The system defined in claim 7 wherein said elongate element has one end portion secured to said deformable member at a first preselected location thereof and its other end secured via a spring to said deformable member at a second preselected location so that said element is tensioned by said spring between said first and second preselected locations over a surface of said deformable member.

9. The system defined in claim 8, comprising a plurality of said magnetic pickup means secured to said deformable member at a same plurality of preselected locations on said surface to sense a local deformation distribution of said deformable member.

10. The system defined in claim 9 wherein said surface is a three dimensional surface encompassing at least the intersecting side surfaces of said deformable member.

11. The system defined in claim 7, claim 8 or claim 9 wherein said elongate element is composed of a material having a low thermal expansion coefficient.

12. A measuring system, comprising:
a magnetic pickup means;
a magnetic scale formed by a succession of discrete, uniformly spaced scaling units each having a pair of magnetic poles (N, S), said magnetic scale being arranged to be displaced relative to the magnetic pickup means by an amount related to a deformation of a deformable member whereby the magnetic pickup means successively senses the passage of the magnetic scaling units; and
circuit means for counting the number of said magnetic scaling units sensed and producing an electrical output signal representing said deformation, or a physical quantity which is a function thereof, said magnetic scale being formed along an arc on a rotary member to which a load is applied at a point thereon between said arc and the axis of rotation of said rotary member in response to said deformation of said deformable member.

13. The system defined in claim 12 wherein said load is applied through an elongate element connected with said point.

14. The system defined in claim 13 wherein said deformable member is constituted by said elongate element.

15. The system defined in claim 13 wherein said elongate element has one end connected to said deformable member acting as said load.

* * * * *